(12) United States Patent
Kojima et al.

(10) Patent No.: US 8,228,369 B2
(45) Date of Patent: Jul. 24, 2012

(54) ENDOSCOPE APPARATUS

(75) Inventors: Kazuaki Kojima, Suwa (JP); Noriyuki Fujimori, Suwa (JP)

(73) Assignee: Olympus Corporation, Tokyo (JP)

( * ) Notice: Subject to any disclaimer, the term of this patent is extended or adjusted under 35 U.S.C. 154(b) by 602 days.

(21) Appl. No.: 12/409,684

(22) Filed: Mar. 24, 2009

(65) Prior Publication Data

US 2009/0244259 A1    Oct. 1, 2009

(30) Foreign Application Priority Data

Mar. 31, 2008 (JP) ................................ 2008-092646

(51) Int. Cl.
*H04N 13/00* (2006.01)
*H04N 15/00* (2006.01)
*A61B 1/04* (2006.01)

(52) U.S. Cl. ............................... 348/45; 348/42; 348/49

(58) Field of Classification Search .................. 348/42, 348/45, 49
See application file for complete search history.

(56) References Cited

U.S. PATENT DOCUMENTS

| 5,305,121 | A | * | 4/1994 | Moll | 348/45 |
| 5,577,991 | A | * | 11/1996 | Akui et al. | 600/111 |
| 5,914,810 | A | * | 6/1999 | Watts | 359/464 |
| 6,760,058 | B2 | * | 7/2004 | Hakamata | 348/45 |
| 7,116,352 | B2 | * | 10/2006 | Yaron | 348/45 |
| 7,734,160 | B2 | * | 6/2010 | Sudo et al. | 396/17 |
| 2001/0012053 | A1 | * | 8/2001 | Nakamura | 348/45 |
| 2006/0258938 | A1 | * | 11/2006 | Hoffman et al. | 600/424 |

FOREIGN PATENT DOCUMENTS

| JP | 2005-205078 | 8/2005 |
| JP | 2007-014653 | 1/2007 |

* cited by examiner

*Primary Examiner* — Liangche A Wang
(74) *Attorney, Agent, or Firm* — Scully, Scott, Murphy & Presser, P.C.

(57) ABSTRACT

An endoscope apparatus includes a polygonal camera module integrally formed at a wafer level by aligning and bonding a light collecting surface side of a lens wafer formed by laminating a plurality of optical wafers on which a plurality of optical parts are formed, and a device surface side of a sensor wafer on which a plurality of solid-state image pickup devices are formed, and then separating the aligned and bonded lens wafer and sensor wafer into individual pieces, wherein an endoscope functional portion is located in a region from an edge end portion of the camera module to an outer peripheral end of an outer shape portion.

7 Claims, 4 Drawing Sheets

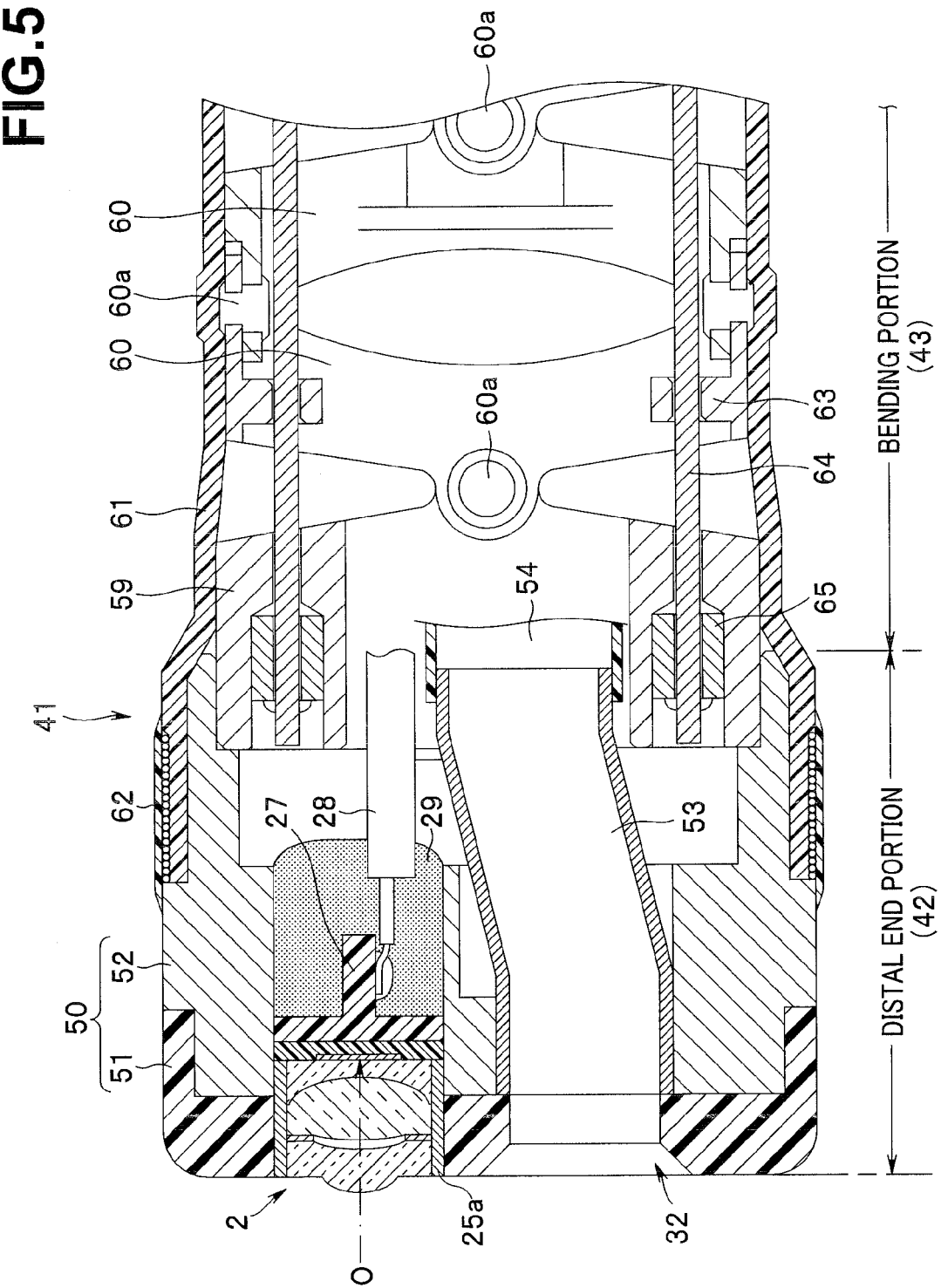

ENDOSCOPE APPARATUS

CROSS REFERENCE TO RELATED APPLICATION

This application claims the benefit of Japanese Application No. 2008-092646 filed on Mar. 31, 2008 the contents of which are incorporated by this reference.

BACKGROUND OF THE INVENTION

1. Field of the Invention

The present invention relates to an endoscope apparatus using a camera module formed at a wafer level.

2. Description of the Related Art

In recent years, endoscopes have been widely used in a medical field and an industrial field. In such conventional endoscopes, an endoscope is dominant in which an image guide is used, and an inside of a body cavity of a patient, an inside of a jet engine, or the like can be observed with an eyepiece through which a user looks in.

Also, for recent endoscopes, an electronic endoscope has emerged in which an image pickup apparatus is incorporated, and an inside of a body cavity of a patient, an inside of a jet engine, or the like is photographed to display an endoscope image on a display apparatus, such as an external monitor. In such an electronic endoscope, an electronic endoscope image pickup apparatus including an objective optical system including a group of a plurality of optical lenses in a distal end portion of an insertion portion is included, as disclosed in Japanese Patent Application Laid-Open Publication No. 2007-14653, for example.

Also, in a field of new technology for medical endoscopes, development of a capsule type endoscope equipped with an image pickup function and a wireless communication function, as disclosed in Japanese Patent Application Laid-Open Publication No. 2005-205078, for example, is also in progress.

SUMMARY OF THE INVENTION

In an endoscope apparatus of the present invention, by including a polygonal camera module integrally formed at a wafer level by aligning and bonding a light collecting surface side of a lens wafer formed by laminating a plurality of optical wafers on which a plurality of optical parts are formed, and a device surface side of a sensor wafer on which a plurality of solid-state image pickup devices are formed, and then separating the aligned and bonded lens wafer and sensor wafer into individual pieces, and by locating an endoscope functional portion in a region from an edge end portion of the camera module to an outer peripheral end of an outer shape portion, an image pickup apparatus can have a smaller size and can be inexpensively manufactured, and an outer shape is downsized. In addition, functional elements on a periphery of the image pickup apparatus are located at optimal positions so that a good picked up image can be obtained.

The above and other objects, features and advantages of the invention will become more clearly understood from the following description referring to the accompanying drawings.

BRIEF DESCRIPTION OF THE DRAWINGS

FIG. 5 is a cross-sectional view along line V-V in FIG. 4 of the distal end portion of the scope endoscope apparatus according to the second embodiment.

DETAILED DESCRIPTION OF THE PREFERRED EMBODIMENTS

The endoscope apparatus according to the present invention will be described below with reference to drawings.

First Embodiment

Figure 1:
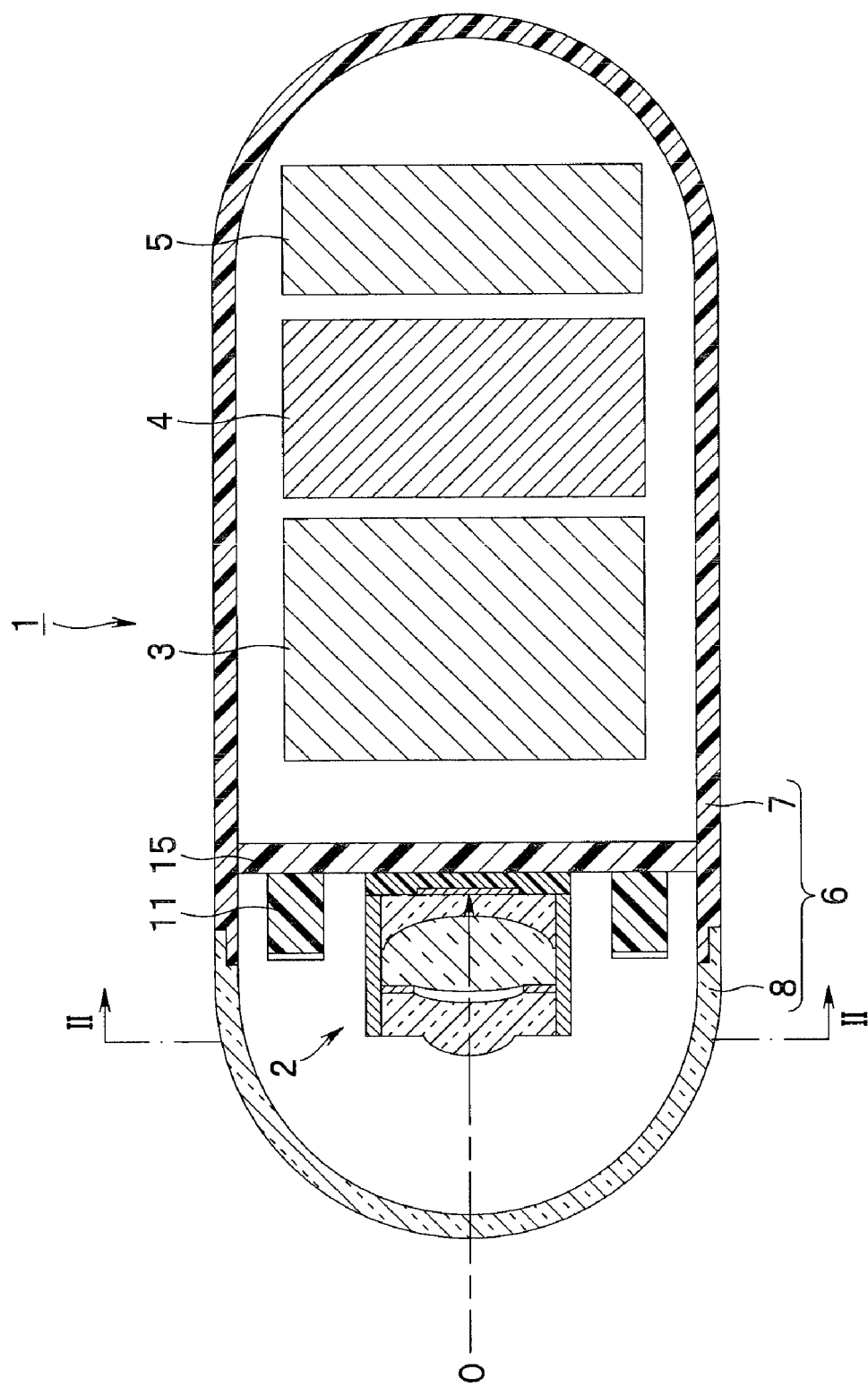
FIG. 1 is a cross-sectional view showing a configuration of a capsule type endoscope apparatus according to a first embodiment.
Figure 2:
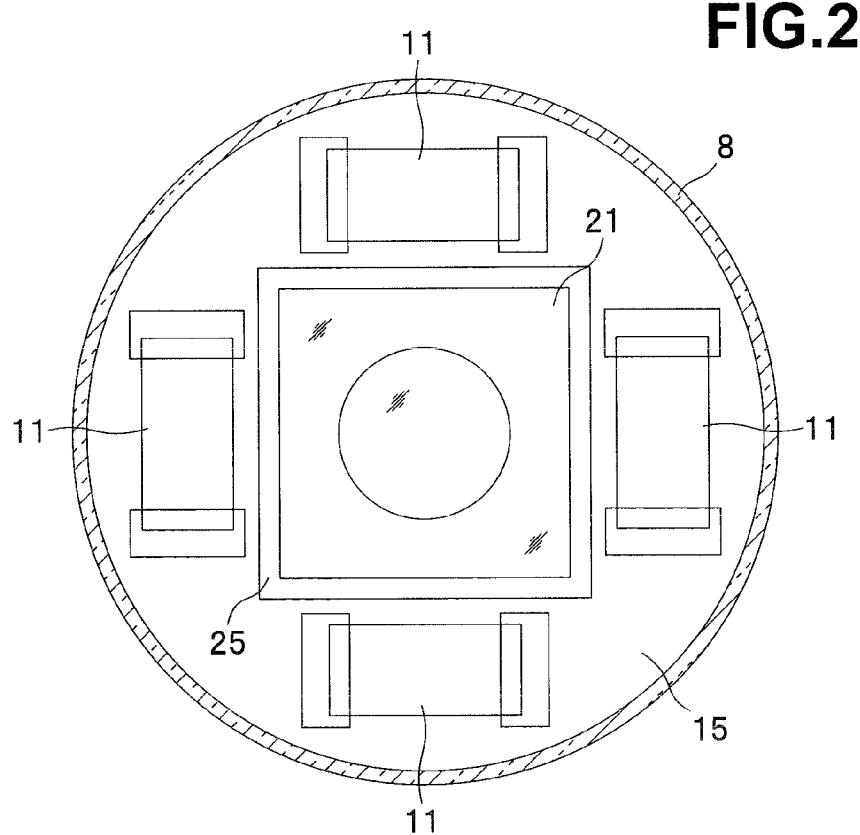
FIG. 2 is a cross-sectional view along line II-II in FIG. 1 of the capsule type endoscope apparatus according to the first embodiment.
Figure 3:
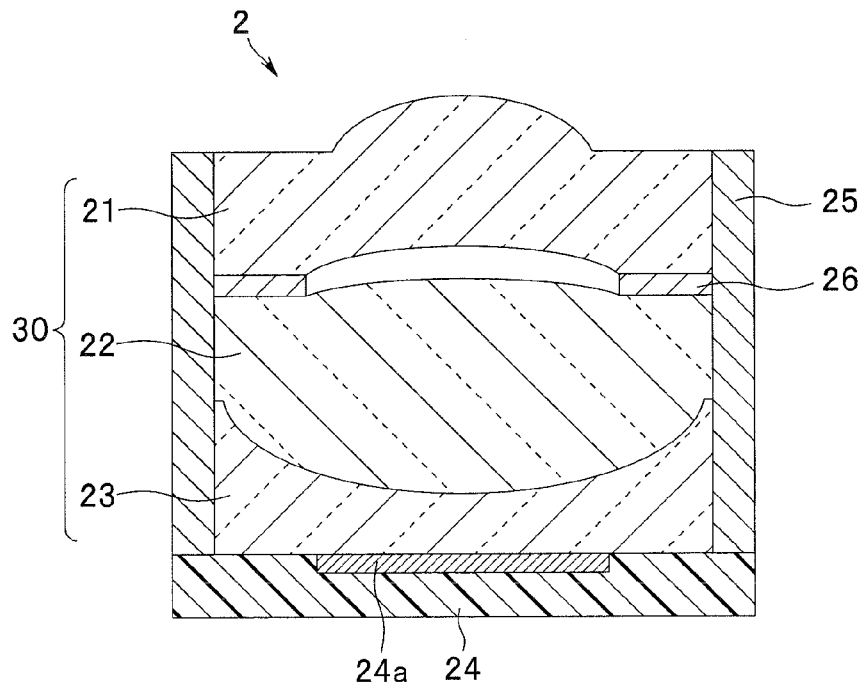
FIG. 3 is a cross-sectional view showing a configuration of a camera module according to the first embodiment.

First, a first embodiment of the present invention is described with reference to FIG. 1 to FIG. 3. FIG. 1 to FIG. 3 relate to the first embodiment of the present invention. FIG. 1 is a cross-sectional view showing a configuration of a capsule type endoscope apparatus, FIG. 2 is a cross-sectional view along line II-II in FIG. 1 of the capsule type endoscope apparatus, and FIG. 3 is a cross-sectional view showing a configuration of a camera module.

In a capsule type endoscope apparatus 1 in the present embodiment shown in FIG. 1 and FIG. 2, a camera module 2 for photographing an inside of a test body, a signal processing circuit unit 3, an RF unit 5, and a battery 4 which is a power source unit, are mainly housed in an exterior case 6 which is an enclosed container. Also, the camera module 2 is mounted on a mounting substrate 15. On the mounting substrate 15, a plurality of, here, four, LEDs 11, which constitute illumination portion constituting endoscope functional portions of the endoscope apparatus, are disposed around the camera module 2.

The exterior case 6 is composed of a bottomed cylinder-shaped outer frame member 7 and a front portion cover 8, which is a semielliptical sphere-shaped dome member, and an inner space is enclosed watertight by the front portion cover 8 being fitted and adhered to block an opening portion of the outer frame member 7. The front portion cover 8 of the exterior case 6 is a light transmissive (transparent) optical dome.

In the camera module 2 in the present embodiment, a shape in the direction orthogonal to a photographing optical axis O located at a generally central position in a direction of a diameter of the cylindrical outer frame member 7 is a rectangular shape, here, a square shape. As shown in FIG. 3, the camera module 2 in the present embodiment has a lens unit 30 formed by laminating a plurality of, here, three, optical parts 21 to 23, and a solid-state image pickup device 24, which is an image sensor, such as a CCD and a CMOS.

Here, only one camera module 2 is shown. The camera module 2 is one obtained by bonding a lens wafer, which is an optical wafer, on which a plurality of the lens units 30 are formed, and a sensor wafer on which a plurality of the solid-state image pickup devices 24 are formed, and then separating the bonded lens wafer and sensor wafer into individual pieces having a square shape. In other words, the camera module 2 is one module of a plurality of modules manufactured by bonding the lens wafer on which the plurality of lens units 30 are formed, and the sensor wafer on which the plurality of solid-state image pickup devices 24 are formed, for integration, and then separating the bonded and integrated lens wafer and sensor wafer into individual pieces.

Further, specifically, the camera module 2 is one manufactured by aligning and bonding one surface side, a photographing light collecting surface side, of the lens wafer, on which the optical parts 23 of the plurality of lens units 30 are formed, and a device surface 24a side of the sensor wafer, on which the plurality of solid-state image pickup devices 24 are formed, for integral formation at a wafer level, and then separating the aligned, bonded, and integrally formed lens wafer and sensor wafer into individual pieces having a square shape, in a manufacturing process.

Of course, the camera module 2 may be formed by separately separating the plurality of lens units 30 on the lens wafer and the plurality of solid-state image pickup devices 24 on the sensor wafer into individual pieces having a generally same square shape, and then bonding one lens unit 30 and one solid-state image pickup device 24. Further, in the camera module 2, the shape in the direction orthogonal to the photographing optical axis O is not limited to a square shape, and, of course, may be a polygonal shape.

Also, a reflective member 25, which is a lens wafer frame body having an outer surface including the so-called mirror surface, is formed on side surfaces of the camera module 2. Further, a plurality of terminals for external connection not shown are formed on a back surface of the solid-state image pickup device 24. The terminals for external connection are connected to electrode pads formed on a surface of the mounting substrate 15, via through holes formed in the solid-state image pickup device 24 itself, to electrically connect the solid-state image pickup device 24 and the mounting substrate 15.

In the camera module 2, a diaphragm film 26 is provided between the optical parts 21 and 22. For the diaphragm film 26, for example, an IR filter may be bonded to a surface of the lens unit 30, and the above diaphragm film 26, such as an acrylic film and a polyolefin film, may be provided on the IR filter. The diaphragm film may be formed by printing a light blocking material on a surface of the lens unit 30 or each of the optical parts 21 to 23.

In the camera module 2 configured as described above, the lens unit 30 in which the diaphragm film 26 is formed, and the solid-state image pickup device 24, which is an image sensor chip, are integrated, so that the camera module 2 can be formed thin in a direction of the photographing optical axis O, compared with image pickup apparatuses disposed in conventional endoscope apparatuses, and a smaller size is possible. Therefore, a reduction in manufacturing cost is also promoted.

Also, the outer frame member 7 is a cylindrical member forming an outer shape of the endoscope apparatus. The LEDs 11, which are the endoscope functional portions in the present embodiment, are located in a region on the mounting substrate 15 sandwiched between edge end portions of the camera module 2 and an inner peripheral end of the outer frame member 7 of the exterior case 6, and illuminate an object with illumination light via the front portion cover 8.

In the capsule type endoscope apparatus 1 in the present embodiment, an outer shape of the camera module 2 is a square shape, so that the four LEDs 11 can be easily positioned and located on the mounting substrate 15 along the respective edge end portions of the camera module 2. Therefore, light distribution balance of illumination light from the LEDs 11 is good, and a good picked up image can be obtained by the camera module 2. Also, illumination light from the LEDs 11 is reflected by the reflective member 25 disposed on the side surfaces of the camera module 2, so that there is also an advantage that a light amount increases. The camera module 2 is located on the mounting substrate 15 so that, at least, the reflective member 25 is positioned on an object side with respect to light emitting surfaces of the LEDs 11, and so that a surface of the lens unit 30 is positioned on the object side.

As described above, in the capsule type endoscope apparatus 1 in the present embodiment, by including the small-size and inexpensive camera module 2 formed at a wafer level, the outer shape of the capsule type endoscope apparatus 1 can also be easily formed in a small size, and formation of an inexpensive endoscope apparatus is possible. Also, in the capsule type endoscope apparatus 1, a direction along the photographing optical axis O can be shortened by the thinly formed camera module 2 included and located. Thus, in the capsule type endoscope apparatus 1, the exterior case 6 is short, and swallowing is improved, so that a burden on a test subject can be alleviated.

Further, in the capsule type endoscope apparatus 1, by the camera module 2 having a polygonal outer shape, the LEDs 11, which are endoscope functional portions, can be located with good balance, in a region sandwiched between the outer frame member 7 of the cylindrical exterior case 6 holding the mounting substrate 15, on which the camera module 2 is mounted, and the edge end portions of the camera module 2, so that a space on the mounting substrate 15 can be effectively used, and a smaller size and a smaller diameter of the endoscope apparatus can be achieved. Also, it is possible to increase a light amount of illumination light illuminating an object by providing the reflective member 25 on the side surfaces of the camera module 2.

An image pickup signal obtained by photoelectrical conversion by the camera module 2 is signal-processed by the processing circuit unit 3 and sent out of a human body by the RF unit 5 by wireless transmission. Also, the image information sent out of the human body is to be read by a receiving portion of external equipment not shown.

Second Embodiment

A second embodiment of the present invention is described below with reference to FIG. 4 and FIG. 5.

Figure 4:
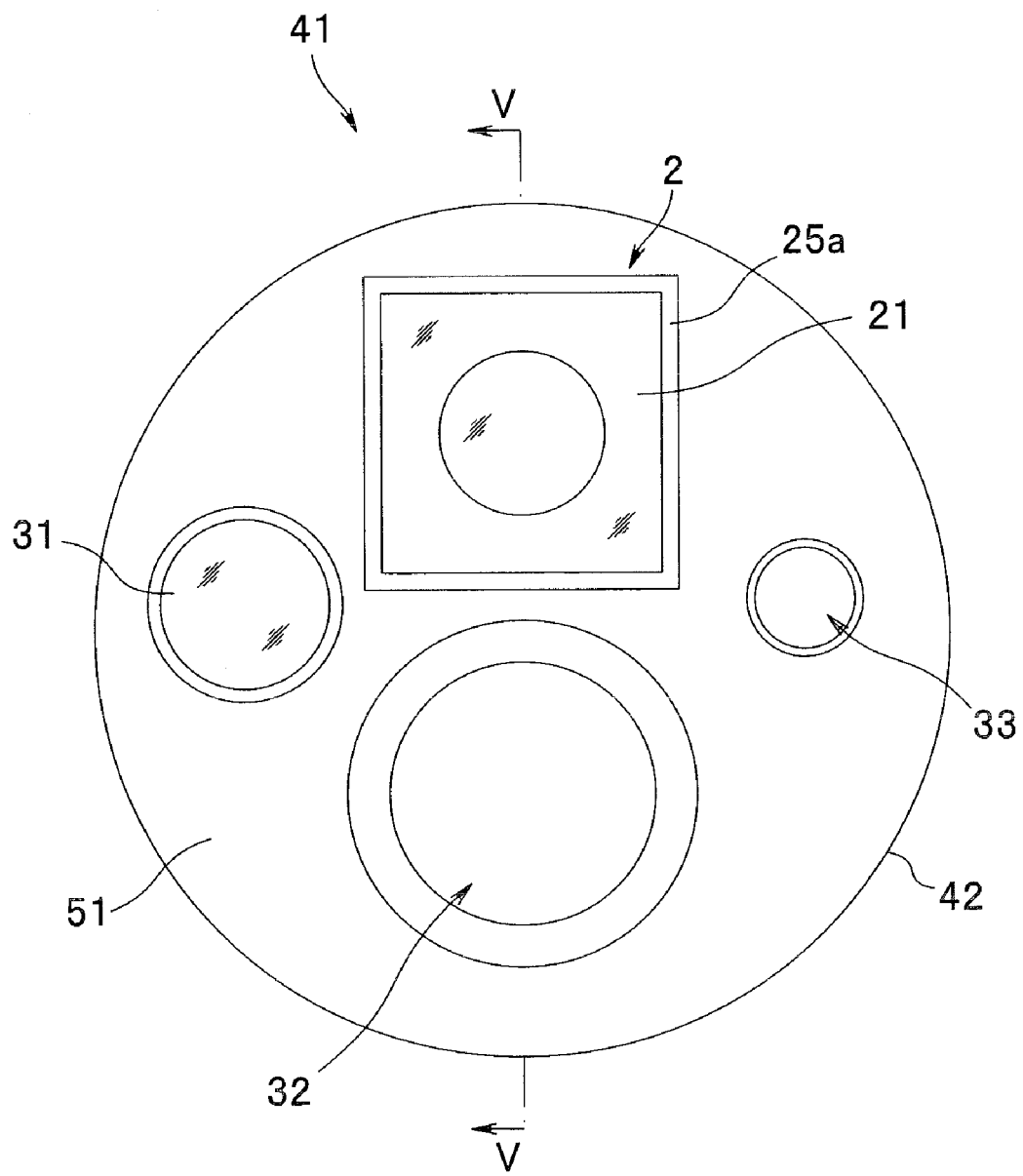
FIG. 4 is a projection of a distal end portion of a scope endoscope apparatus according to a second embodiment as seen from a front.

FIG. 4 and FIG. 5 relate to the second embodiment of the present invention. FIG. 4 is a projection of a distal end portion of an endoscope apparatus as seen from a front, and FIG. 5 is a cross-sectional view along line V-V in FIG. 4 of the distal end portion of the endoscope apparatus. In the following description, same numerals are used for same components as components in the first embodiment described above, and detailed description, and action and effect of the components are omitted.

An endoscope apparatus in the present embodiment is a medical scope including an insertion portion 41, wherein the insertion portion 41 is inserted into a digestive organ, as shown in FIG. 4 and FIG. 5. The insertion portion 41 of the endoscope apparatus is constituted by continuously providing a distal end portion 42, a bending portion 43, and a flexible tube portion not shown.

The distal end portion 42 has a cover body 51 having a front surface constituting a distal end surface of the insertion portion 41, and a distal end rigid block 52 fitted and fixed to the cover body 51, and an outer shape portion 50 is formed by the cover body 51 and the distal end rigid block 52.

On a distal end surface of the distal end portion 42, a surface of the optical part 21 of the camera module 2 is disposed so as to be aligned with a position of a surface of the cover body 51, and an illumination window 31, which constitutes an endoscope functional portion in the present embodiment for illuminating with illumination light guided by a light guide not shown, and which is an illumination optical part, and two opening portions 32 and 33 are disposed. Of the two opening portions 32 and 33, one opening portion 32 is in communication with a forceps channel, and the other opening portion 33 is in communication with an air feed and water feed channel. Some endoscope apparatuses do not include the air feed and water feed channel and the forceps channel, and in the case of such endoscope apparatuses, the two opening portions 32 and 33 may not be provided on the distal end surface of the distal end portion 42.

The camera module 2 in the present embodiment is one manufactured by aligning and bonding one surface side, the photographing light collecting surface side, of the lens wafer, on which the optical parts 23 of the plurality of lens units 30 are formed, and the device surface 24a side of the sensor wafer, on which the plurality of solid-state image pickup devices 24 are formed, for integral formation at a wafer level, and then separating the aligned, bonded, and integrally formed lens wafer and sensor wafer into individual pieces having a square shape, in a manufacturing process, as in the first embodiment described above (see FIG. 3).

Also, the solid-state image pickup device 24 of the camera module 2 is mounted on a mounting substrate 27 having a same outer shape as an outer shape of the solid-state image pickup device 24. A core of a communication cable 28 for supplying power to the solid-state image pickup device 24 and sending and receiving an image pickup signal to and from external equipment is electrically connected to the mounting substrate 27 by solder or the like.

The camera module 2 configured in this manner is located so that one side of the camera module 2 is in proximity to the outer shape portion 50 of the distal end portion 42. Instead of the reflective member 25 in the first embodiment, a light blocking member 25a is provided on the side surfaces of the camera module 2 in the present embodiment.

When the camera module 2 is inserted and fitted into a hole portion formed in the distal end rigid block 52, and the cover body 51 is fitted to the distal end rigid block 52, the camera module 2 is fastened by an adhesive 29 filling the hole portion of the distal end rigid block 52 so that the surface of the optical part 21 is aligned with the position of the surface of the cover body 51.

Also, the illumination window 31 for the light guide, the opening portion 32 for the forceps channel, and the opening 33 for the air feed and water feed channel, which are endoscope functional portions, are located in a region sandwiched between other edge end portions of the camera module 2 and an outer peripheral end of an outer peripheral portion of the outer shape portion 50.

The light guide is formed by bundling a plurality of fibers, and a rear end of the light guide is connected to a light source apparatus, not shown, by a connector, though not shown. Illumination light illuminating an object in front of the endoscope apparatus from the illumination window 31 is transmitted via the light guide. In the present embodiment, illumination light for illuminating the object is transmitted using the light guide connected to the light source apparatus, however, a light source, such as an LED, an organic EL, and an inorganic EL, may be used instead of the light guide connected to the light source apparatus.

The forceps channel is composed of a metal cylinder tube 53 in communication with the opening portion 32, and a flexible tube body 54 closely fixed outside a proximal end portion of the metal cylinder tube 53. The flexible tube body 54 is inserted and located in the insertion portion 41 and is in communication with a treatment instrument insertion port opened in an operation portion, not shown, of the endoscope apparatus. The forceps channel is for introducing a treatment instrument and the like and leading the treatment instrument and the like out of the opening portion 32 in the distal end surface of the insertion portion 41, mainly during test and treatment, and for suctioning a mucous membrane, dirt, and the like in a body cavity from the opening portion 32.

The air feed and water feed channel is for removing soil, water drops, and the like on the surface of the optical part 21 constituting a distal end lens of the camera module 2, and for ejecting air or water into a body cavity from the opening 33 in the distal end surface of the insertion portion 41. A nozzle for ejecting air or water toward the surface of the optical part 21 of the camera module 2 may be provided in the opening 33.

Here, a configuration of the bending portion 43 of the endoscope apparatus is briefly described.

In the bending portion 43, a rigid distal end bending piece 59 fitted and attached to a proximal end opening portion of the distal end rigid block 52 of the distal end portion 42, and a plurality of rigid bending pieces 60 (also referred to as bending node rings) are continuously provided so as to be freely rotated by a pivot portion 60a. The pieces 59 and 60 are covered with a bending outer skin 61 including an elastic member, such as biocompatible fluororubber and the like. A distal end portion of the bending outer skin 61 is fastened to a proximal end outer peripheral portion of the distal end rigid block 52 of the distal end portion 42 by a thread wound adhesive portion 62.

The plurality of bending pieces 60 have wire guides 63 protruding in a direction of a center from inner peripheral surfaces of the plurality of bending pieces 60. A bending operation wire 64 (also referred to as an angle wire) is inserted through the wire guide 63.

Four of the bending operation wires 64 are present in the bending portion 43 (only two are shown in FIG. 5), and a cylindrical locking member 65 is welded to each of the distal end portions of the bending operation wires 64 by solder or the like. For the bending operation wires 64, respective locking members 65 are locked in four locking hole portions formed in the distal end bending piece 59.

The four locking hole portions in the distal end bending piece 59 are formed at four equally divided positions at generally equal intervals in a surface orthogonal to a central axis of the distal end bending piece 59. In the distal end bending piece 59, directions orthogonal to an axis is determined so that the locking hole portions are positioned corresponding to top, bottom, left, and right of an endoscope image photographed by the camera module 2. Therefore, the four bending operation wires 64 are held and fixed at four points spaced at generally equal intervals in top, bottom, left, and right directions.

Also, the bending operation wires 64 are inserted in the insertion portion 41 and disposed up to the operation portion not shown. Two bending operation knobs for pulling and loosening the four bending operation wires 64 are provided in the operation portion. Therefore, when the four bending operation wires 64 are respectively pulled and loosened back and forth, the plurality of bending pieces 60 rotate correspondingly. Thus, the bending portion 43 is bent in four directions.

Also, the above-described bending operation wires 64 are respectively inserted in coil sheathes not shown, in the flexible tube portion not shown. The coil sheath has a non-compressive structure in which a wire is closely wound in a shape of a pipe.

In the endoscope apparatus in the present embodiment configured as described above, by using the small-size and inexpensive camera module 2 formed at a wafer level, a small-size and inexpensive endoscope apparatus can be easily formed, and by locating the endoscope functional portion in a region on the distal end surface of the distal end portion 42 sandwiched between the camera module 2 and an inner peripheral end of the outer shape portion 50 of the endoscope apparatus, a space in the distal end portion 42 can be effectively used, and a smaller size and a smaller diameter of the endoscope apparatus can be achieved, as in the first embodiment.

In the distal end portion 42 of the endoscope apparatus in the present embodiment, a direction along the photographing optical axis O can be shortened by the thinly formed camera module 2 included and located, compared with conventional image pickup apparatuses. Thus, in the endoscope apparatus, the rigid distal end portion 42 is short, and insertion properties of the insertion portion 41 is improved, so that a burden on a test subject can be alleviated during insertion of the insertion portion into a body cavity.

Also, unnecessary light entering the camera module 2 from the illumination window 31, which is an illumination portion for illumination light transmitted from the light guide, can be blocked by providing the light blocking member on the side surfaces of the camera module 2.

The invention described above is not limited to the embodiments, and in the stage of implementation, various modifications can be made without departing from the gist thereof. Further, inventions in various stages are included in the embodiments, and various inventions can be extracted by appropriate combinations of a plurality of components disclosed.

For example, when the effects described is obtained for problems to be solved by the invention even if some components are eliminated from all components shown in the embodiments, a configuration in which the components are eliminated can be extracted as the invention.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An endoscope apparatus comprising
a polygonal camera module prepared as one of a plurality of polygonal camera modules, the plurality of polygonal camera modules being integrally formed at a wafer level by aligning and bonding a light collecting surface side of a lens wafer formed by laminating a plurality of optical wafers on which a plurality of optical parts are formed, and a device surface side of a sensor wafer on which a plurality of solid-state image pickup devices are formed, and then separating the plurality of polygonal camera modules integrally formed at the wafer level into individual polygonal camera modules,
wherein an endoscope functional portion is located in a region from an edge end portion of the camera module to an outer peripheral end of an outer shape portion.

2. The endoscope apparatus according to claim 1, wherein the endoscope functional portion constitutes an illumination portion for illuminating a test region with illumination light, and
wherein a reflective member is provided in an outside surface portion of the camera module at least on a test target side with respect to the illumination portion.

3. The endoscope apparatus according to claim 2, wherein the illumination portion is mounted on a same substrate on which the camera module is mounted.

4. The endoscope apparatus according to claim 2, wherein the illumination portion is one of an LED, an organic EL, an inorganic EL, and a light guide.

5. The endoscope apparatus according to claim 2, comprising an opening portion of at least an air feed and water feed portion or a forceps channel portion, constituting the endoscope functional portion different from the illumination portion.

6. The endoscope apparatus according to claim 3, comprising an opening portion of at least an air feed and water feed portion or a forceps channel portion, constituting the endoscope functional portion different from the illumination portion.

7. The endoscope apparatus according to claim 4, comprising an opening portion of at least an air feed and water feed portion or a forceps channel portion, constituting the endoscope functional portion different from the illumination portion.

* * * * *